United States Patent

Kessler et al.

Patent Number: 6,144,179
Date of Patent: Nov. 7, 2000

[54] METHOD FOR ESTABLISHING THE ROTATIONAL SPEED OF MECHANICALLY COMMUTATED D.C. MOTORS

[75] Inventors: Erwin Kessler, Saulgau; Wolfgang Schulter, Meersburg, both of Germany

[73] Assignee: Temic Telefunken microelectronic GmbH, Heilbronn, Germany

[21] Appl. No.: 09/112,205

[22] Filed: Jul. 9, 1998

[30] Foreign Application Priority Data

Jul. 9, 1997 [DE] Germany .............................. 197 29 238

[51] Int. Cl.$^7$ .................................................. G05B 23/02
[52] U.S. Cl. ..................... 318/565; 318/615; 318/671; 318/439; 318/490; 324/177
[58] Field of Search ............................ 318/565, 685, 318/696, 615–617, 629, 671, 683, 684, 439, 490; 324/160, 166, 168, 177; 73/488; 702/57, 64, 65, 66, 70–78

[56] References Cited

U.S. PATENT DOCUMENTS

| | | | |
|---|---|---|---|
| 3,675,126 | 7/1972 | Chilton ..................................... | 324/168 |
| 4,227,129 | 10/1980 | Brooks ..................................... | 388/809 |
| 4,443,745 | 4/1984 | Seino et al. ............................. | 318/461 |
| 4,527,101 | 7/1985 | Zavis et al. ............................. | 318/245 |
| 4,684,858 | 8/1987 | Ma et al. ................................. | 388/820 |
| 4,744,041 | 5/1988 | Strunk et al. ........................... | 364/565 |
| 4,788,498 | 11/1988 | Uemura ................................ | 324/207.16 |
| 5,017,845 | 5/1991 | Carobolante et al. .................. | 318/138 |
| 5,181,232 | 1/1993 | Take .......................................... | 377/30 |
| 5,296,794 | 3/1994 | Lang et al. ............................... | 318/715 |
| 5,317,243 | 5/1994 | Cameron ................................... | 318/254 |
| 5,581,178 | 12/1996 | Richter et al. ........................... | 324/177 |
| 5,616,996 | 4/1997 | Tang et al. ............................... | 318/439 |
| 5,898,288 | 4/1999 | Rice et al. ................................. | 318/685 |

FOREIGN PATENT DOCUMENTS

| | | |
|---|---|---|
| 0689054 A1 | 12/1995 | European Pat. Off. . |
| 0730156 A1 | 9/1996 | European Pat. Off. . |
| 3527906 A1 | 2/1987 | Germany . |
| 3935585 A1 | 4/1991 | Germany . |

OTHER PUBLICATIONS

"Elektrotechnick–Elecktronik" by Helmut Lindner. 2nd Edition, pp. 198–209. 1983.

"Unkonventionelle Drehzahlmessung and –regelung bei Gleichstrommotoren" (Unconventional speed measurement and control of d.c. motors) by Birk, Elektronik 25, Dec. 14, 1984, p. 71 et seq.

Primary Examiner—Brian Sircus
Attorney, Agent, or Firm—Venable; Norman N. Kunitz

[57] ABSTRACT

The method for determining the rotational speed and/or the angle of rotation of mechanically commutated d.c. motors from the variation with respect to time of the ripple of the motor current occurring during commutation is supplemented and checked by a motor state model that functions in parallel to it and is based on the electromechanical motor equations. A probable value of the actual speed is extrapolated from the motor current and the motor voltage and a permissible reference time range is determined for the next commutation. If no commutation time can be established in the reference time range, the extrapolated value is used. Otherwise, the current speed is determined precisely from the commutation time measured in the reference time range. The load-dependent motor constant for the motor state model can be preset as a fixed value or it can be adjusted to the actual speed after commutation processes have been detected. Faults in the measurement and evaluation of the motor current ripple that occurs during commutation can be avoided and the interference-free forwarding of the actual values needed for determining and controlling positions of electrically operated parts can be safeguarded.

5 Claims, 3 Drawing Sheets

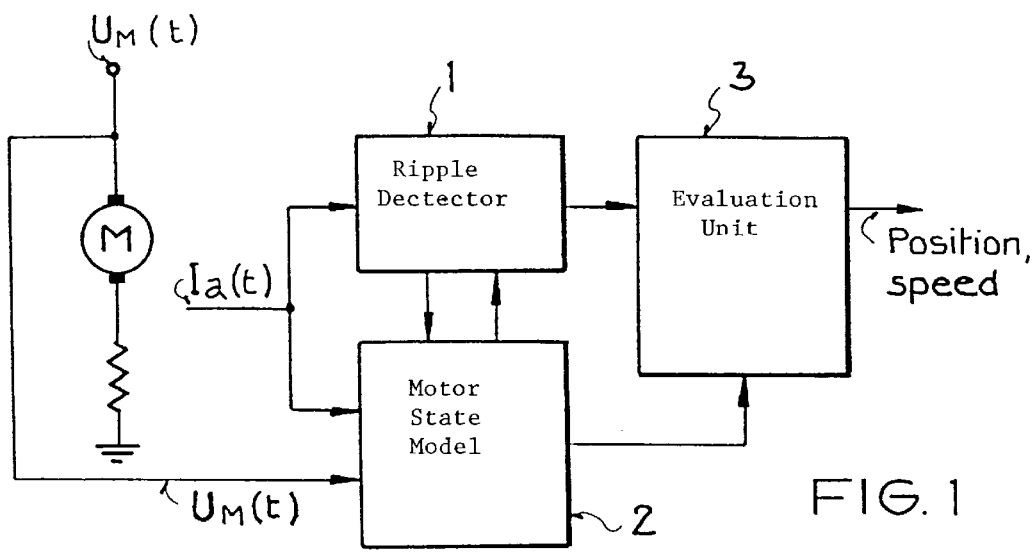
FIG. 1
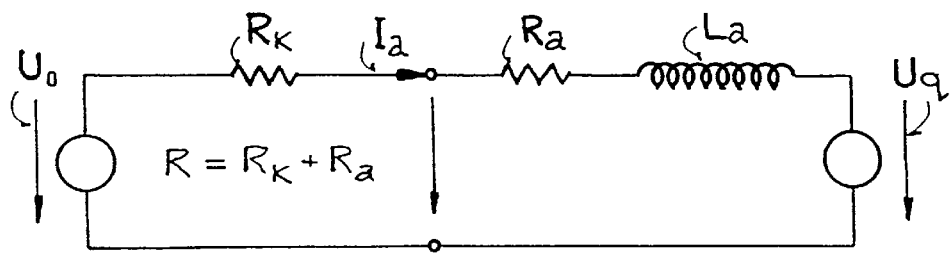
FIG. 4a
FIG. 4b
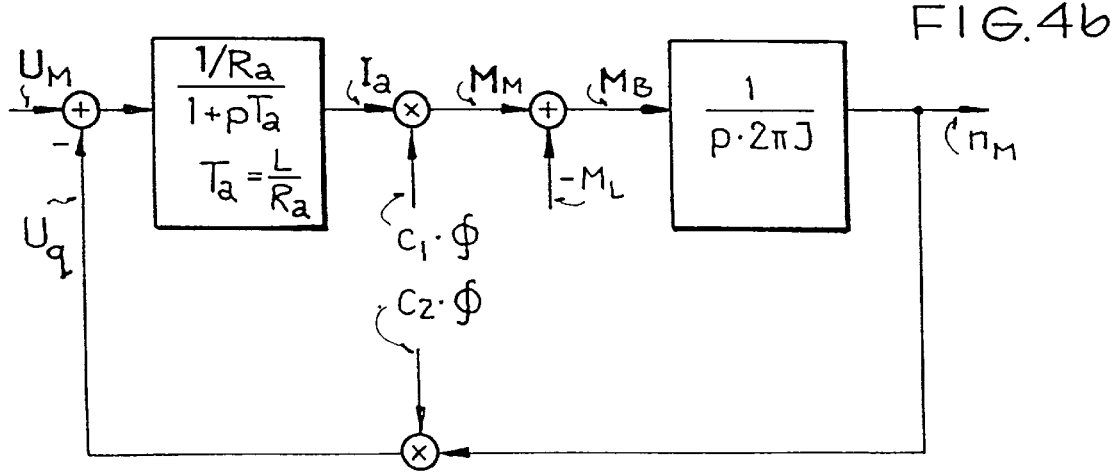

METHOD FOR ESTABLISHING THE ROTATIONAL SPEED OF MECHANICALLY COMMUTATED D.C. MOTORS

BACKGROUND OF THE INVENTION

The invention relates to a method for establishing the rotational speed of mechanically commutated d.c. motors and/or the distance traveled by them in accordance with the preamble of Patent claim 1. Such methods are described in, for example, EP 0 689 054 A1, EP 0 730 156 A1 and DE 39 35 585 A1.

It is general knowledge that the alternating component of the current in d.c. motors, the ripple, can be detected, evaluated and used as a measure of the rotational speed of the motor. In DE 35 27 906 A1, for example, a so-called zero-crossing method is described in which the zero crossings of the current are detected after elimination of the direct component.

It is furthermore known that the behavior of d.c. motors can be described by means of an electromechanical motor state model based on the motor equations as shown in FIGS. 4a and 4b. The motor equation $U_q(t)=c\cdot\Phi\cdot n(t)$, also known as generator equation, the motor equation $M_m(t)=c_1\cdot\Phi\cdot I_a(t)$ and the electrical relationship $$U_q(t) = U_M(t) - I_a(t)\cdot R_a - L\cdot \frac{\partial I_a(t)}{\partial t}$$

is also to be found in relevant literature such as, for example, Lindner: Reference Volume "Elektrotechnik—Elektronik", Leipzig, 2nd Printing 1983, p. 199 et seq. The reference symbols (see FIGS. 4a, 4b and also the equations) are selected analogously in an appropriate form and signify specifically $U_q$ the induced armature voltage; $c_1$, $c_2$ the motor-specific quantities, also known as motor constants, $\Phi$ the magnetic flux, n the rotational speed, $M_L$ the load moment, $M_m$ the motor moment and $M_B$ the resulting acceleration moment, $I_a$ the motor or armature current, $U_M$ the motor terminal voltage, $R_a$ the armature resistance, $R_k$ the external terminal resistance, L the inductance of the motor winding and J the mass moment of inertia of the entire rotating arrangement including the parts to be moved such as, for example, the windows.

In the generic method of EP 0 689 054 A1, the generated signal of ripple is phase shifted and the phase-shifted signal is added or subtracted to the non-phase-shifted whereby a signal is obtained that is free of double commutation phenomena.

The so-called ripple-count method is also described in this literature. The paper "Unkonventionelle Drehzahimessung and -regelung bei Gleichstrommotoren" (Unconventional speed measurement and control of d.c. motors) by Birk, Elektronik 25, 14.12.1984, p. 71 et seq., describes the incremental determination of speed from the commutation ripple of the armature current.

The fundamental problems associated with the detection and evaluation of ripple are also mentioned in the above literature, in particular the susceptibility to faults in the line voltage and double commutations. The circuitry involved is considerable in all compensation methods and ultimately the possibility of faults occurring cannot be excluded.

SUMMARY OF THE INVENTION

The invention describes the development of the methods in accordance with the preamble of claim 1 such that the compensation becomes less complex and the interference immunity can be maintained or improved upon.

The object is solved by the characterizing features of Patent claim 1. Advantageous developments of the invention are described in the Subclaims.

Fundamentally, the aim is, by means of the motor state model, to provide a permissible reference time range and to make allowance in the evaluation unit for the results of the in-parallel analysis of the variation of the motor current ripple over time if they are within the reference time. The quantities other than motor current and motor voltage required for the motor state model are either stipulated or derived from the motor current and motor voltage curves and adapted accordingly. Thus, the motor impedance can be determined at the starting point of time even before overcoming static friction because in this case the speed is still zero and there is no induced armature voltage $U_q$. By making multiple measurements of motor current and voltage, the value of the motor impedance can be adapted and therefore faults can to a large extent be excluded. Furthermore, the temperature and load dependent motor constant c can be redetermined after each commutation process and therefore the influence of load and temperature can be allowed for in the next extrapolation. If the working period of the motor is to be relatively short, the motor constant c can also remain at the stipulated value over the entire working period because the thermal influence in particular varies at a relatively much slower and weaker rate.

The process steps given in Patent claim 4 show a particularly simple implementation of the process according to the invention. Here, first of all in each case the next commutation point of time is extrapolated by means of the motor state model, the reference time range is defined and the variation of the ripple is observed within this range.

One advantage of the concept of the invention becomes clear when, as a result of faults, no commutation process can be detected because then the extrapolated probable value of the next commutation time is available to the evaluation unit.

After detection of a commutation process within the permissible reference time range, not only are the present speed and angle of rotation increment updated as required with the precise value but also the motor constant. The quantities to be stipulated, such as the motor constant which is stipulated at least at the time of starting the motor and then adapted if need be, as well as a tolerance $\Delta T$ for determining the permissible reference time range around the probable next commutation point of time T(m+1), can be stored without any special effort when manufacturing the motor control or they can be defined for a particular application.

The method according to the invention supplements the known methods for ripple evaluation, increases their interference immunity and, in particular, does not require the expensive Hall sensors that are otherwise frequently necessary for positioning tasks.

The invention will now be described more closely with reference to an example of embodiment and the Figures.

BRIEF DESCRIPTION OF THE DRAWINGS

FIG. 1 Schematic block diagram of an arrangement for performing the method

FIGS. 4a & b Electrical and mechanical motor state model according to the state of the art

DESCRIPTION OF THE PREFERRED EMBODIMENTS

FIG. 1 shows in a schematic block diagram an arrangement for performing the method. The motor voltage $U_M(t)$ of motor M is measured and, via a measuring shunt, the motor current $I_a(t)$. On the one hand, the motor current $I_a(t)$ is supplied to the ripple detector 1, an arrangement for detecting the commutation from the ripple of the motor current $I_a(t)$, and on the other hand it is also supplied to the motor state model 2 which additionally measures the motor voltage $U_M(t)$. Ripple detector 1 and motor state model 2 are interlinked and exchange firstly the extrapolated results and secondly the real results detected from the motor current $I_a(t)$. The motor state model 2 thus supplies the ripple detector 1 each time with the reference time range $T(m+1)\pm\Delta T$ for the following commutation process $T_k(m+1)$ and at the same time one revolution is measured via the number of revolutions m. If this commutation process $T_{k(m+1)}$ is detected reliably and within the reference time range $T(m+1)\pm\Delta T$, the actual speed n(t) that can be derived from this and the motor constant c are adjusted accordingly should this be necessary as the result of a deviation.

Furthermore, the ripple detector 1 and the motor state model 2 are each connected to the evaluation unit 3 which compares the speed $n_M(t)$ extrapolated in the motor state model and the reference time range $T(m+1)\pm\Delta T$ with the speed n(t) determined from the motor current $I_a(t)$ and supplies the output values speed n and angle of rotation $\phi$ from the more probable quantity in each case.

Figure 2:
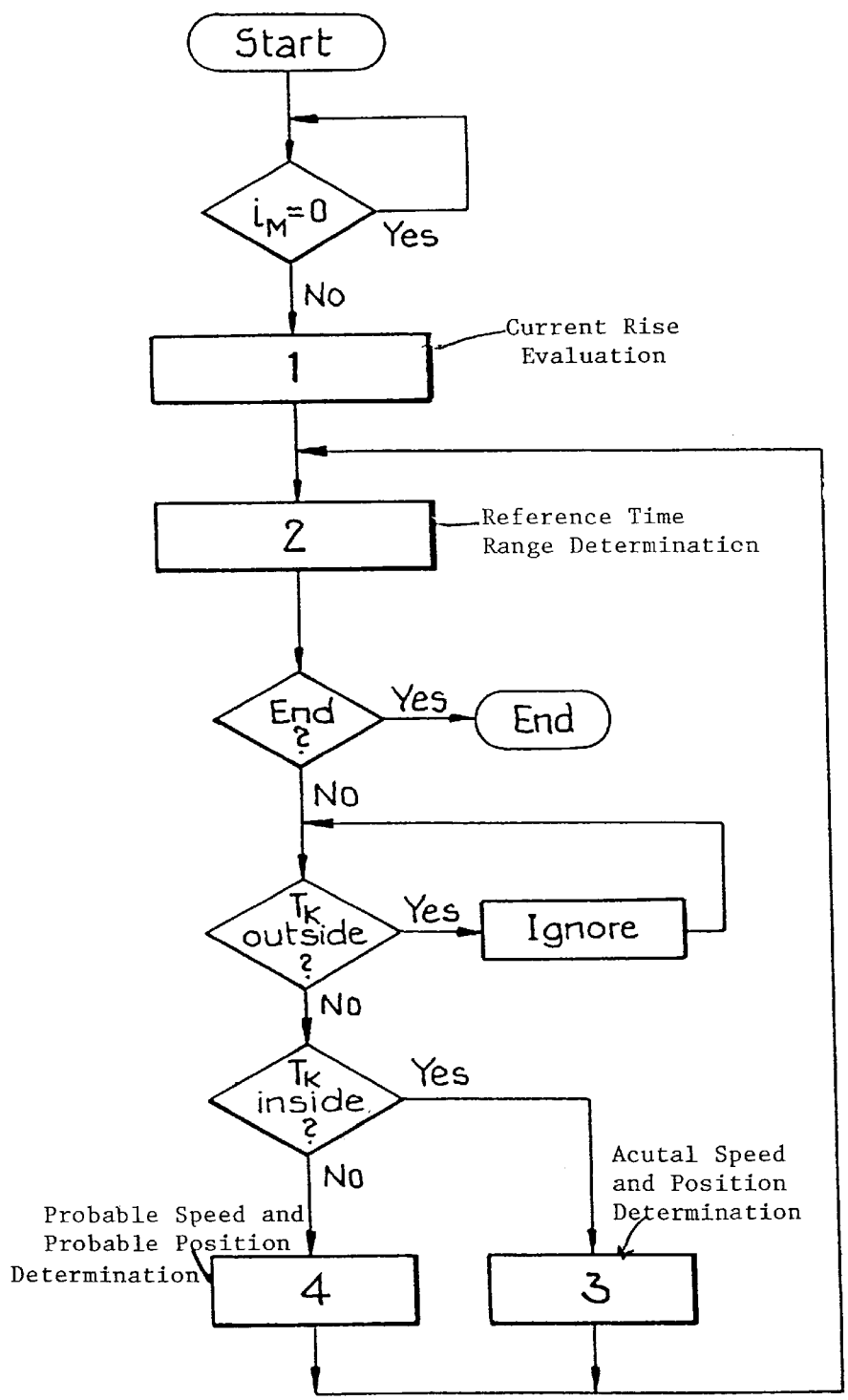
FIG. 2 Sequence chart of the method

In FIG. 2, a flowchart shows the sequence of steps used by the method. On connecting a supply voltage, the sequence is started automatically and a test is made to establish whether there is any motor current. The motor current indicates at this stage whether the motor has been activated.

If the motor is switched on resulting in the flow of motor current, first of all the current rise is measured before the static friction has been overcome and the motor impedance is determined, or at the least the ohmic component in accordance with the equation $R=U_M/I_a$ in the vicinity of the reversal point because, of course, before the static friction is overcome no armature voltage $U_q$ will be induced and the inductive component is negligibly small compared with R. This current rise evaluation is represented in FIG. 2 by block 1.

When the static friction moment has been overcome, a voltage is induced by the armature which is now rotating. This voltage can be derived constantly from the motor current $I_a(t)$ and the motor voltage $U_M(t)$ in accordance with the formula $$U_q(t) = U_M(t) - I_a(t) \cdot R_a - L \cdot \frac{\partial I_a(t)}{\partial t}$$

which is simplified even further when the inductance L is negligible. The probable speed $n_m$ can first of all be estimated from this in accordance with $U_q(t) \approx c \cdot n_M(t)$. The reference time range $T(m+1)\pm\Delta T$ of the next commutation $T_k(m+1)$ is then derived from the probable speed $n_M(t)$. This takes place in block 2 of FIG. 2. A stipulated value is used as motor constant c for the first commutation process, however this is redefined each time after detection of the first commutation.

Furthermore, it is tested whether an angle of rotation increment corresponding to the speed n can still arise or whether the end of the presetting path has been exceeded, in which case the motor is switched off.

In the following, the motor current $I_a(t)$ is monitored by means of the ripple detector 1 (see FIG. 1). The evaluation unit 3 shown in FIG. 1 observes whether the ripple detector 1 detects current peaks beyond the reference time range $T(m+1)\pm\Delta T$ of the next commutation $T_k(m+1)$ and ignores them because they are due to external disturbances of the motor current $I_a(t)$ as a result, for example, of connecting other loads to the supply network.

If a detectable current ripple occurs within the reference time range $T(m+1)\pm\Delta T$, it is first of all identified as the next commutation process $T_k(m+1)$. As block 3 in FIG. 2 is intended to indicate, first of all the speed is determined specifically and the angle of rotation increment is set for the purpose of counting the position at this point of time. Furthermore, on the basis of the detected commutation process and the actual speed, the motor constant c can be redetermined and adjusted for the next calculation. This allows the process to be adjusted to varying motor conditions, widely different presetting velocities and load changes or to heating up during operation.

If no current ripple is detected, however, for example as the result of a fault, the probable speed $n_m$ and the probable commutation time $T(m+1)$ derived from this is assumed. Speed and increment of rotation are adjusted accordingly and specified when the next detectable current ripple occurs.

Once again the probable speed and the next commutation process are derived from current and voltage and the process is repeated until the end of the presetting path has been reached.

By this method it can therefore be ensured that the evaluation unit can reliably forward the position and speed and distinguish double commutations etc.

Figure 3:
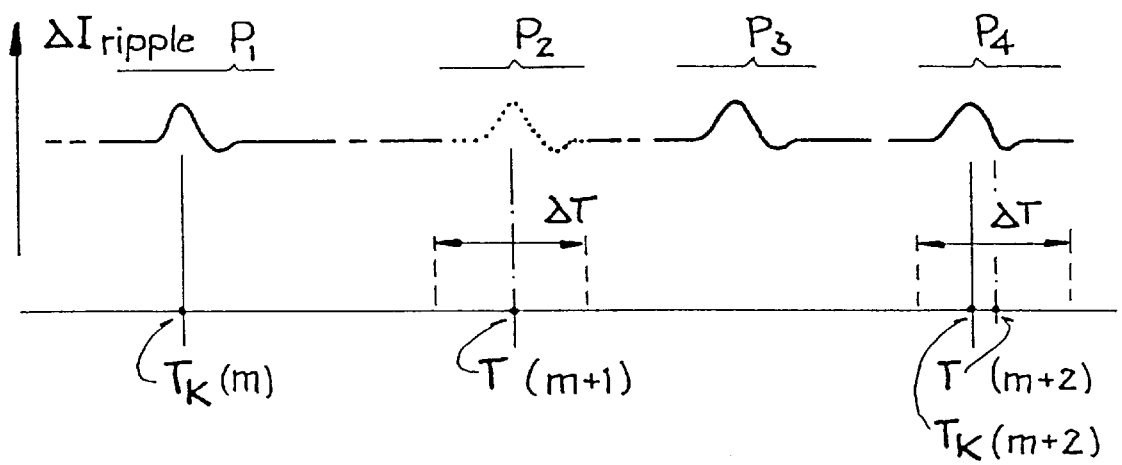
FIG. 3 Sketch showing the various possible ripple events

In period $P_1$, FIG. 3 shows how the commutation time $T_k(m)$ is determined from a distinctly detectable current ripple. In particular, the first commutation time is determined on the basis of which the present value of the motor constant c is subsequently determined and the subsequent probable commutation time $T(m+1)$ is extrapolated.

In period $P_2$, the case is shown where no, or no distinctly detectable, current ripple is identified (indicated by the dotted function curve) within the reference time range $T(m+1)\pm\Delta T$. The probable commutation time $T(m+1)$ is then used (see FIG. 3: the dotted marking on the time axis specifies the adopted commutation time).

If a current ripple occurs outside of the reference time range $T(m+1)\pm\Delta T$, as shown in period $P_3$, it is ignored (no point is given on the time axis).

If a current ripple occurs within the reference time range $T(m+2)\pm\Delta T$, the next commutation time $T_k(m+2)$ is identified even if it is different from the extrapolated probable T(m+2), as shown in period $P_4$. The detected commutation time $T_k(m+2)$ is used for the following extrapolation.

What is claimed is:

1. Method for establishing the rotational speed (n) and/or the angle of rotation ($\phi$) of mechanically commutated d.c. motors from the variation with respect to time of the ripple of the motor current ($I_a(t)$) that occurs during commutation, in that a) the variation with respect to time of the ripple of the motor current ($I_a(t)$) is measured, the time points of the commutation ($T_k$) are determined and the speed (n) and/or the angle of rotation ($\phi$) are derived from this in an evaluation unit 3, wherein b) in parallel to measuring the ripple of the motor current ($I_a(t)$) from a motor state model based on the electro-mechanical motor equations, a permissible reference time range ($T(m+1)\pm\Delta T$) is determined from the motor current ($I_a(t)$) and the motor voltage ($U_M(t)$), c) the time points of commutation ($T_K(m)$) are allowed for by the evaluation unit (3) only if these are within the permissible reference time range ($T(m+1)\pm\Delta T$), d) if within the permissible reference time range ($T(m+1)\pm\Delta T$) no ripple of a commutation can be assigned, the evaluation unit (3) extrapolates a probable commutation time $T(m)$ for this reference time range ($T(m+1)\pm\Delta T$) from the motor state model.

2. Method in accordance with claim 1, wherein at least the ohmic component of the motor impedance is established at the starting point of time by determining the motor current ($I_a$) and the motor voltage ($U_M$) at least once before overcoming the static friction.

3. Method in accordance with claim 2, wherein motor current and motor voltage are measured more than once before overcoming the static friction and from the values measured for motor current and motor voltage preferably the value of the motor impedance, but at least its ohmic component R, is matched adaptively.

4. Method in accordance with claim 1, wherein the following process steps are involved:

a) with the rise of motor current and motor voltage, motor current $I_a(t)$ and motor voltage $U_M(t)$ are measured more than once before the static friction is overcome and the values of, preferably, the motor impedance, but at least its ohmic component R, are matched adaptively b) the motor current $I_a(t)$ and the motor voltage $U_M(t)$ are measured preferably continuously, but at least in the proximity of the commutation time point c) in the motor state model, the induced armature voltage $U_q(t)$ is determined as a quantity that is proportional to the speed in accordance with the simplified equation $$U_q(t) = U_M(t) - I_a(t) \cdot R_a - L \cdot \frac{\partial I_a(t)}{\partial t}$$

and the probable speed $n_M(t)$ is extrapolated in accordance with the equation $U_q(t) \approx c \cdot n_M(t)$, where c is a motor constant which is c1) adapted from the actual speed $n(t)$ determined so far from the commutations and from the motor current $I_a(t)$ and the motor voltage $U_M(t)$ in accordance with the equation $$c(t) = \frac{U_M(t) - I_a(t) \cdot R - L \cdot \frac{\partial I_a(t)}{\partial t}}{n(t)},$$

where L is the inductance of the motor winding, c2) or, preferably only at the time of motor start, is preset as a fixed value, d) from the probable speed $n_M(t)$, the reference time range $T(m+1)\pm\Delta T$ of the next commutation $T_K(m+1)$ is stipulated in accordance with the equation $T(m+1)=T_K(m)+1/n_M(t)$, where $\Delta T$ is a specified tolerance quantity and $T(m+1)$ is the probable next commutation point of time, e) the variation of the ripple of the motor current $I_a(t)$ is observed with respect to time over the reference time range $T(m+1)\pm\Delta T$ and e1) either the ripple occurring in this time interval is identified as permissible commutation process $T_K(m+1)$, from which the current speed $n(t)=n(T_K(m+1))=1/(T_K(m+1)-T_K(m))$ and the increment of the angle of rotation $\phi(t)=\phi(T_K(m+1)=\phi(T_K(m))+1=m+1$ are forwarded from the evaluation unit and the motor constant c is adjusted as $c(T_K(m+1))$ on the basis of $n(t)$ in accordance with step c1), or e2) if no permissible commutation process $T_K(m+1)$ is detected in the reference time range $T(m+1)\pm\Delta T$, the extrapolated probable speed $n_M(T(m+1))$ and the increment of the angle of rotation $\phi(t)=\phi(T_K(m))+1=m+1$ at the probable time $T(m+1)=1/n_M(T(m+1))+T_K(m)$ are forwarded by the evaluation unit (3), and f) all ripples encountered outside of the reference time range $T(m+1)\pm\Delta T$ are ignored and the process steps b) to e) are repeated.

5. Use of the method defined in claim 1 in particular for determining and controlling positions in parts driven by electric motors through incrementation of the angle of rotation from a zero point assigned to a first zero-speed position, in particular in order to detect jammings when at the same time a second stationary position has not yet been reached.

* * * * *